United States Patent [19]

Nola

[11] 4,426,614
[45] Jan. 17, 1984

[54] PULSED THYRISTOR TRIGGER CONTROL CIRCUIT

[75] Inventor: Frank J. Nola, Huntsville, Ala.

[73] Assignee: The United States of America as represented by the Administrator of the National Aeronautics and Space Administration, Washington, D.C.

[21] Appl. No.: 325,932

[22] Filed: Nov. 30, 1981

[51] Int. Cl.³ .............................................. H02P 5/40
[52] U.S. Cl. .................................... 323/243; 318/799; 323/246
[58] Field of Search ...................... 307/252 B; 318/799, 318/809, 810; 323/205, 237, 241–244, 246, 300, 326

[56] References Cited
U.S. PATENT DOCUMENTS 4,052,648 10/1977 Nola ..................................... 318/810
4,266,177 5/1981 Nola ..................................... 318/810
4,271,387 6/1981 Mukai et al. ......................... 323/246
4,379,254 4/1983 Hurban ................................ 323/243

Primary Examiner—A. D. Pellinen
Attorney, Agent, or Firm—Joseph H. Beumer; John R. Manning; Leon D. Wofford, Jr.

[57] ABSTRACT

A trigger control circuit is provided for producing firing pulses for the thyristor of thyristor control system such as a power factor controller. The control circuit overcomes thyristor triggering problems involved with the current lag associated with controlling inductive loads and utilizes a phase difference signal, already present in the power factor controller, in deriving a signal for inhibiting generation of a firing pulse until no load current is flowing from the preceding half cycle and thereby ensuring that the thyristor is triggered on during each half cycle.

9 Claims, 20 Drawing Figures

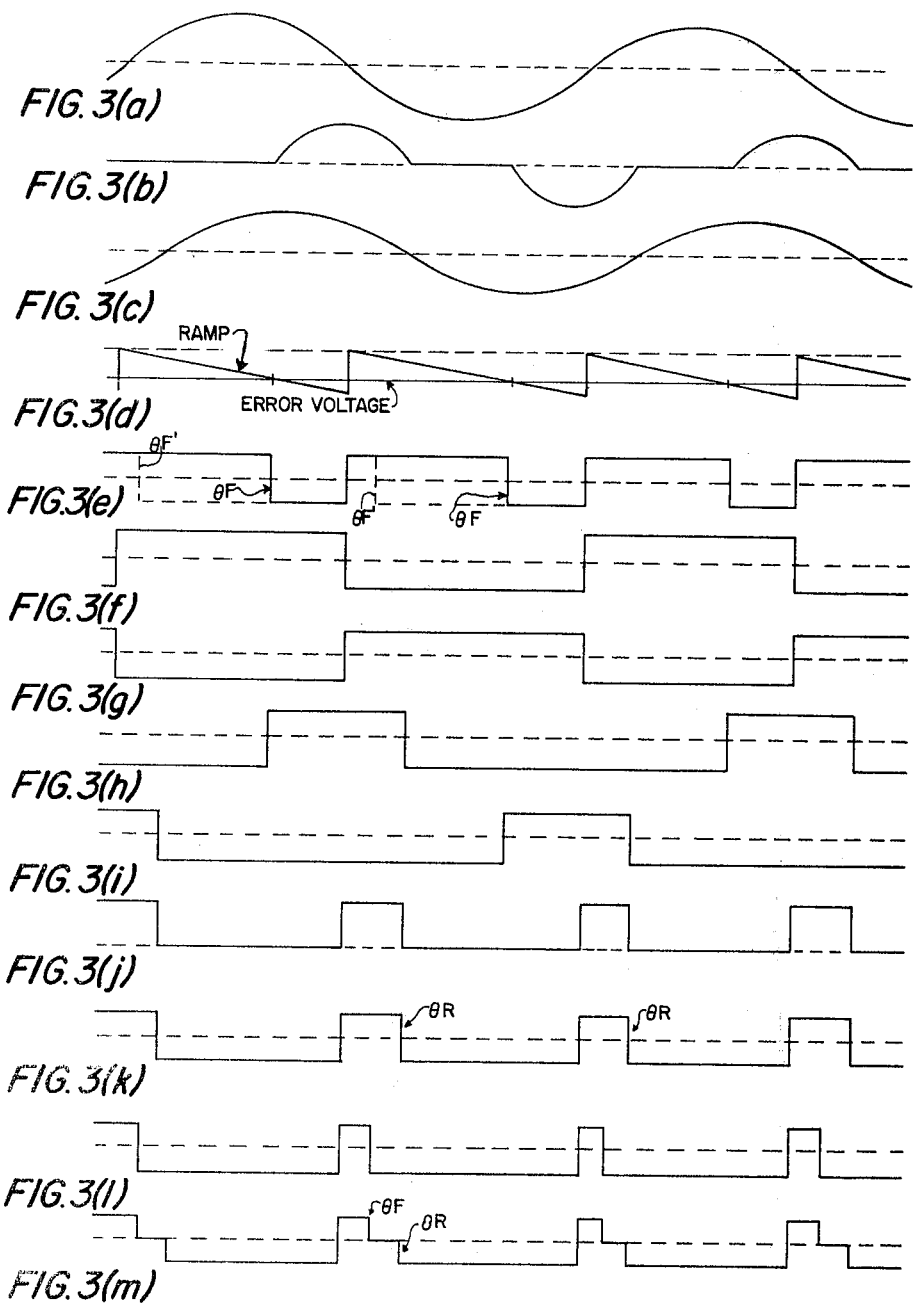

PULSED THYRISTOR TRIGGER CONTROL CIRCUIT

ORIGIN OF THE INVENTION

This invention described herein was made by an employee of the United States Government and may be manufactured and used by or for the Government of the United States for governmental purposes and without the payment of any royalties thereon or therefor.

TECHNICAL FIELD

The present invention relates to switching circuitry for thyristors used with inductive loads such as a motor, and in particular, used in power factor controllers for such loads.

BACKGROUND ART

In U.S. Pat. Nos. 4,052,648 (Nola) and 4,266,177 (Nola), there are disclosed power factor controllers which are particularly useful in connection with inductive loads such as induction motors. These controllers, which sample the line voltage and current through the motor, include a thyristor which controls the power input to the motor in proportion to the detected phase difference between the sampled voltage and current, such that less power is provided to the motor in response to decreasing motor loading.

As is well understood in the art, a thyristor, i.e., an SCR or triac, will switch on if the gate electrode thereof is supplied with a current pulse whose duration may typically be of only a few microseconds, and will remain on until the anode current goes to a zero level. If the thyristor is used to control a sinusoidal current in a resistive load, the trigger pulse can be applied during any portion of the sine wave since the current will also be precisely in phase with the voltage. However, the current in an inductive load significantly lags the voltage and this can create problems in connection with triggering of the thyristor. More specifically, as is explained in more detail hereinbelow, if the firing or trigger pulse is generated at a time when current is flowing from the preceding half cycle (due to the current phase lag), the triac will already be turned on at that time. Further, when the current goes to zero and the triac goes off, the triac will remain off for an entire half cycle. Thus the trigger pulse will be without effect. The disadvantages of such operation in a thyristor control system are evident.

In a power factor controller of the type discussed above, this problem is avoided by supplying thyristor gate current using a fixed level signal rather than a trigger pulse. However, it will be appreciated that supplying a fixed level signal results in considerably more power consumption than supplying a trigger pulse. Moreover, in certain power factor controllers employing triacs, wherein the gate power is derived directly from the line voltage it has been found necessary to use a sensitive gate pilot triac to turn on the main power triac.

SUMMARY OF THE INVENTION

In accordance with the invention, a triggering circuit for a thyristor is provided which utilizes a trigger pulse to fire the thyristor and which inhibits generation of the trigger pulse if current is flowing from the preceding half cycle. The circuit is particularly adapted for use in power factor controllers such as discussed above because it uses a signal already existing in such a power factor controller to inhibit the firing pulse. Thus, the trigger circuit of the invention eliminates the problems discussed above with reference to pulse firing while also retaining the advantages of pulse firing over fixed level firing and doing away with the need for the use of pilot triacs.

According to a preferred embodiment thereof, a triggering circuit is provided for a thyristor control system for an alternating current input to other than a completely resistive load (i.e., a load which results in a phase difference between the load current and voltage waveforms), the trigger circuit comprising pulse producing means for producing firing pulses for firing the thyristor, means for deriving a control signal for said thyristor based on the phase difference between the load current and voltage, and mean responsive to the control signal for inhibiting production of a firing pulse until a time when no load current is flowing from the previous half cycle of the alternating current input. Preferably, the pulse producing means comprises an electronic switching device such as a transistor and the firing pulse inhibiting means controls the "on" time of the transistor. Advantageously, the pulse firing inhibiting means establishes a reference point for triggering the triac based on the phase difference signal and inhibits producing of a firing pulse in advance of the reference point. The base of the control transistor for the thyristor is connected to receive a first signal from the inhibiting means and a second signal from a control circuit for the thyristor, and in an advantageous embodiment, the thyristor is connected so as to be turned on only when the signals are negative. The firing angle of the second signal controls the turn on time of the transistor, and thus the thyristor, so long as this firing angle occurs after the reference angle; however, when the firing angle is in advance of the reference angle, the transistor is not turned on until the reference angle is reached.

Other features and advantages of the invention will be set forth in, or apparent from, the detailed description of the preferred embodiments which follows.

BRIEF DESCRIPTION OF THE DRAWINGS

FIGS. 3(a) to 3(m) are waveforms associated with the system of FIG. 2 and used in explanation of the operation of the trigger circuit of the invention.

DESCRIPTION OF THE PREFERRED EMBODIMENTS

Figure 1A:
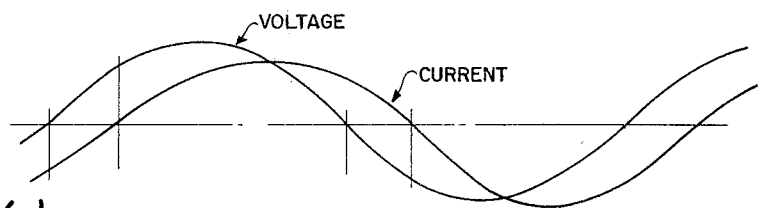
FIGS. 1(a) to 1(f) are waveforms associated with conventional thyristors, used in explanation of the problem overcome by the invention.
Figure 1B:
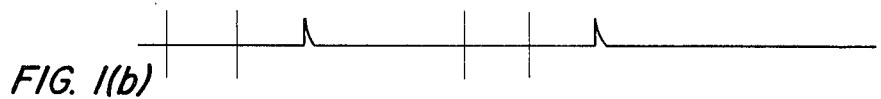
Figure 1C:
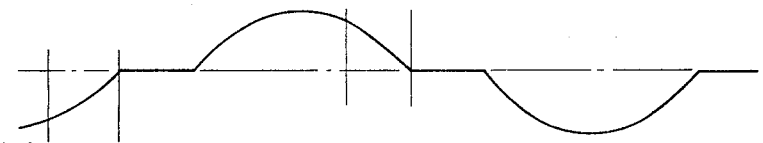
Figure 1D:
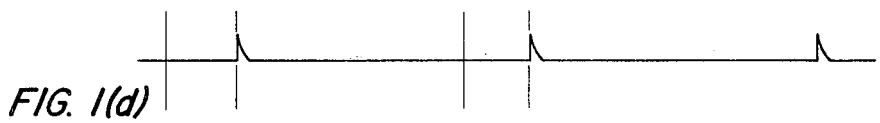
Figure 1E:
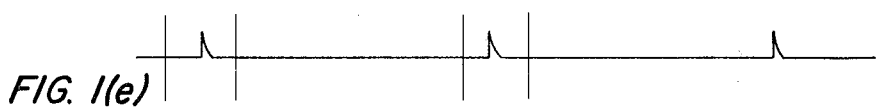
Figure 1F:
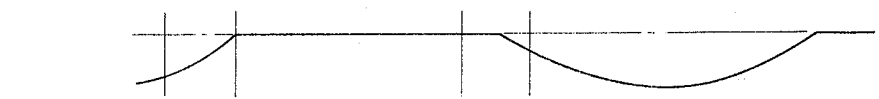

Referring first to FIGS. 1(a) to 1(f), these figures show waveforms associated with conventional thyristor operation and which are helpful in understanding the problem overcome by the present invention. With a thyristor connected to an A.C. input to provide an output current when triggered "on" or fired, and with input current and voltage waveforms as shown in FIG. 1(a), it will be understood that if the firing pulse for the thyristor occurs at a time such as indicated in FIG. 1(b), the output current will be that shown in FIG. 1(c). Similarly, the firing pulse is advanced in time so as to coincide with the zero crossing of the current waveform, as indicated in FIG. 1(d), continuous current will flow, i.e., the current will be the same as shown in FIG. 1(a). If the firing pulse is advanced further in time, as indicated in FIG. 1(e), such that the firing pulse actually occurred when current was flowing in the previous half cycle (and the thyristor is already "on"), when the current goes to zero, the thyristor is turned off and, because the firing pulse has already occurred, the thyristor will remain off for the entire ensuring half cycle, as is indicated in FIG. 1(f), It is this problem that the present invention seeks to overcome. However, before exploring the invention in more detail, a control system in which the invention is incorporated will now be considered.

Figure 2:
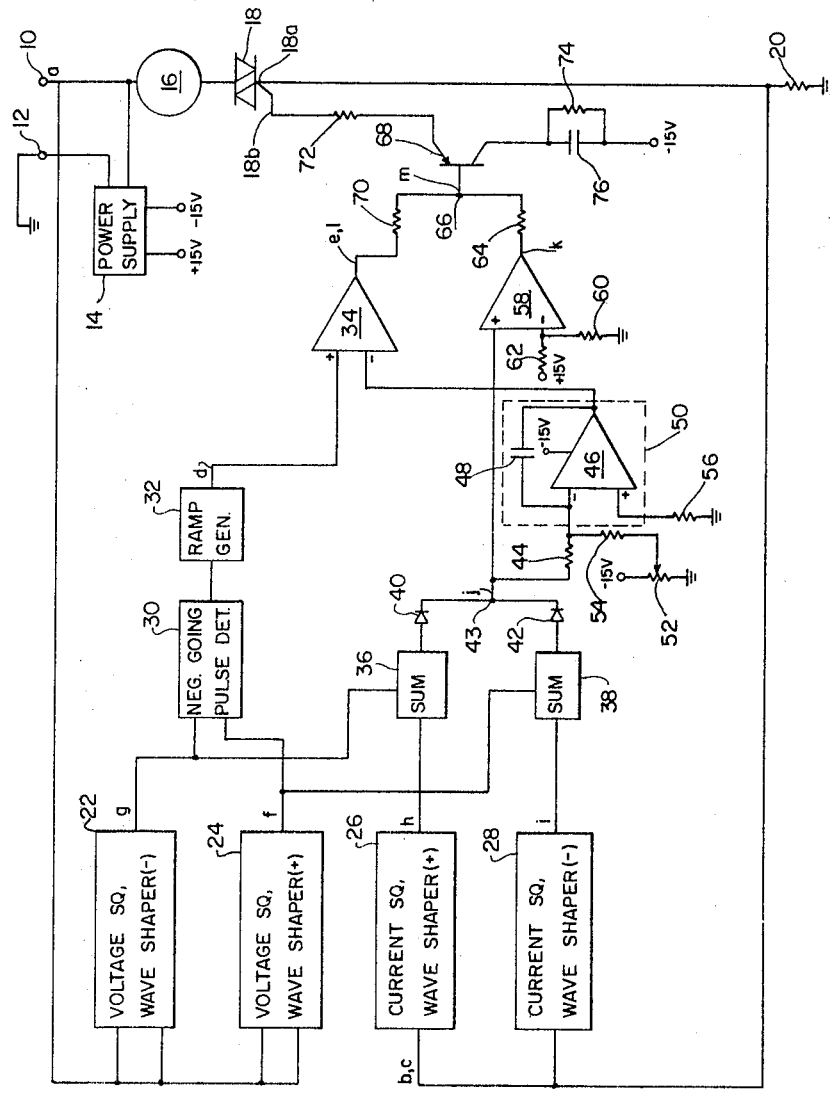
FIG. 2 is a schematic circuit diagram, partially in block form, of a power factor controller incorporating the trigger control circuit of the invention.

Thus, turning now to FIG. 2, there is shown a preferred embodiment of the invention as incorporated in a power factor controller or control system similar to that disclosed in U.S. Pat. No. 4,266,177. The system shown in FIG. 2 is similar to that described in the patent just referred to and the subject matter of that patent is hereby incorporated by reference.

The system of FIG. 2 includes input terminals 10 and 12 which receive the input waveform (which is typically 115 volts A.C. and is illustrated in FIG. 3(a), and which are connected to a power supply circuit 14 and across the series combination of the winding or windings of a motor 16, a thyristor (triac) 18 and a current sensing resistor 20. The input terminal 10 is also connected to positive and negative voltage squaring circuits 24 and 22 which produce respective oppositely phased, full wave, rectangular wave outputs "f" and "g", illustrated in FIGS. 3(f) and 3(g), respectively. A signal voltage is developed across current sensing resistor 20 which is illustrated in FIG. 3(b) for a representative mode of operation of triac 18 and in FIG. 3(c) for continuous operation (with triac 18 always on), and which is applied to the inputs of full wave current squaring wave shapers 26 and 28. Wave shaper 26 is responsive only to positive half cycles of the current waveform, and in response to the current waveform shown in FIG. 3(b), produces a rectangular output waveform "h" shown in FIG. 3(h). Wave shaper 28 is responsive only to negative half cycles of the current waveform and, in response to the current waveform illustrated in FIG. 3(b), produces a rectangular output waveform "i" shown in FIG. 3(i).

The outputs "g" and "f" of voltage squaring wave shapers 22 and 24 are connected to a negative going pulse detector 30 which produces negative spikes used in triggering a ramp generator 32 connected to the output of detector 30. The output of ramp generator 32 is connected to the positive (non-inverting) input of an operational amplifier 34 which functions as a zero crossing detector. A control signal to be described below is connected to the negative (inverting) input of operational amplifier 34.

The control signal referred to above is a function of (1) a signal based on the phase difference between the current and voltage applied to motor 16 and (2) a command or reference signal to be described below. The phase difference signal is derived by a selected combination of the outputs of shapers 22, 24, 26 and 28. Specifically, the outputs of shapers 22 and 26 are summed in a summing circuit or summer 36 and the outputs of shapers 24 and 28 are summed in a summer 38. The signals so produced are rectified by diodes 40, 42 and summed at summing point 43 to provide the output signal "j" illustrated in FIG. 3(j). The pulses shown in FIG. 3(j) are of a constant amplitude and variable width, the width or duration of these pulses being dependent on the phase difference between the input voltage and current.

The pulse signal shown in FIG. 3(j) is applied through a resistor 44 to a further operational amplifier 46 and a capacitor 48 connected to form an integrator 50.

The command signal referred to above is derived from a potentiometer 52 which is set with motor 16 unloaded and, as explained in U.S. Pat. No. 4,266,177 referred to above, provides a selected power factor or phase angle between current and voltage as determined by the greatest power factor (smallest motor current-voltage phase difference) at which the motor will operate for the loading range to be encountered. The tap of potentiometer 52 is connected to the negative input of amplifier 46 through a resistor 54. The positive input is connected to ground through a resistor 56.

The output of integrator 50 is the control signal referred to above and is, as stated, connected to the negative (inverting) input of operational amplifier 34.

The circuitry described thus far is similar to that for system described in U.S. Pat. No. 4,266,177. In accordance with the invention as incorporated in such a system, a further operational amplifier 58 is provided, the positive (non-inverting) input of which is connected to the summing point 43 and the negative (inverting) input of which is connected to receive a positive bias or reference voltage developed by a voltage divider formed by resistors 60 and 62. The output voltage from amplifier 58 is connected through a resistor 64 to a summing point 66 connected to the base of a control transistor 68. The output of operational amplifier 34 is connected through a resistor 70 to summing point 66 and thus to transistor 68. The emitter of transistor 68 is connected through a resistor 72 to the gate electrode of traic 18 while the collector of transistor 68 is connected to an RC timing circuit formed by a resistor 74 and a capacitor 76.

Considering the operation of the system of FIG. 2, the phase difference signal at summing point 43 (shown in FIG. 3(j)) is conditioned by being fed to the non-inverting input of amplifier 58. As mentioned above, a positive bias voltage is applied to the inverting input of amplifier 58 through the voltage divider formed by resistors 60 and 62. The resultant output waveform "k" is shown in FIG. 3(k). This voltage is summed at summing point 66 with the output of amplifier 34, the latter being a fixed level firing pulse as shown in FIG. 3(e) and being derived from the ramp output "d" (shown in FIG. 3(d)) and the control signal output of integrator 50. As will be seen from comparing FIG. 3(d) and FIG. 3(e), the firing angle θF is controlled by the intersection of the ramp "d" and the control signal output of integrator 50. Because the emitter of transistor 68 is essentially at ground potential, transistor 68 will be turned on when the base drive therefor drops negative. Thus, both input signals "e" and "k" must simultaneously be negative in order to turn transistor 68 on. In this regard, if both inputs are positive, transistor 68 is off whereas if one is negative and the other positive, the two inputs sum to zero as is indicated by the comparing the waveforms shown in FIGS. 3(e) and 3(k), and thus transistor 68, is, again, off (no base current will flow with a zero volt base drive). Thus, the signals "k" and "e" are effectively "ANDed" and transistor 68 will turn on only when both are negative.

When transistor 68 is turned on, triac 18 is also turned on, with gate current flowing from the ground terminal thereof, indicated at 18a, through gate terminal 18b, resistor 72, transistor 68, and the RC network formed by resistor 74 and capacitor 76, to the negative supply. The amount of current flow, which is typically 50 to 100 milliamps, is determined by the value of resistor 72. The length of time this current flows, which is typically 10 microseconds, is determined by the RC time constant. In this regard, a current flow of 100 milliamps for 10 microseconds can be readily be supplied by the filter capacitor (not shown) associated with power supply 14. Resistor 74 provides a discharge path for capacitor 76 during each half cycle.

If the firing angle $\theta F$, shown in FIG. 3(e) as varied by the power factor controller in response to a varying load, is greater than the reference angle, $\theta R$, shown in FIG. 3(k), the turn on time of triac 18 will be coincident with the firing angle $\theta F$. As the load increases on the motor 16, the firing angle or point $\theta F$ will advance in time, i.e., move to the left in FIG. 3(e), so as to increase the on time of transistor 68, until the firing angle $\theta F$ is equal to or greater than reference angle $\theta R$. This latter situation is illustrated in FIG. 3(l) and by firing angle $\theta F'$ and the dashed line waveform in FIG. 3(e). Under these circumstances, the base drive for transistor 68 is the signal shown in FIG. 3(m). It will be seen that transistor 68 will not turn on at the firing angle $\theta F$ since the base drive voltage is zero at that time, and will remain zero until the time $\theta R$. At the time $\theta R$, both signals "l" and "k" are negative and transistor 68 is turned on to provide firing of triac 16.

Although the invention has been described with respect to a preferred embodiment thereof, it will be understood by those skilled in the art that variations and modifications can be effected in this exemplary embodiment without departing from the scope and spirit of the invention.

I claim:

1. A thyristor control system for an alternating current input to a load which produces a difference in phase between the load current and voltage waveforms and comprising a thyristor for controlling the current flow through the load, the improvement comprising pulse producing means for producing firing pulses for firing said thyristor the duration of which is short relative to the duration of the alternating current half cycle and is independent of the load, means for deriving a control signal for said thyristor based on the phase difference between the load current and voltage, and means responsive to said control signal for inhibiting production of a firing pulse for firing said thyristor until a time when no current is flowing from the previous half cycle of the alternating current input.

2. A thyristor control system as claimed in claim 1 wherein said pulse producing means comprises an electronic switch device and said inhibiting means comprises means for controlling the on time of said electronic switch device.

3. A thyristor control system as claimed in claims 1 or 2 wherein said inhibiting means including means responsive to said control signal for establishing a reference point in time during a half cycle in advance of which production of a firing pulse for firing said thyristor is inhibited and at which time a firing pulse is produced.

4. A thyristor control system as claimed in claim 1 wherein said pulse producing means comprises a transistor and said inhibiting means comprises means for ensuring that the base drive for said transistor is such as to prevent the transistor from being turned on prior to a reference point in time related to the phase difference between the load current and voltage and for providing a firing pulse for turning on said transistor at said reference point in time.

5. A thyristor control system as claimed in claim 4 wherein the base of said transistor is connected to receive a first signal from said inhibiting means and a second signal from a control circuit for controlling firing of said thyristor, said thyristor being connected such that said first and second signals must both be of the same polarity before said transistor is turned on.

6. A thyristor control system as claimed in claim 1 wherein said thyristor control system comprises a power factor controller and said means for deriving a control signal based on the phase difference between the load current and voltage is responsive to phase difference signals existing in the power factor controller.

7. A thyristor control system as claimed in claim 1 wherein said load comprises an induction motor and said thyristor control system comprises a power factor controller for controlling the power supplied to said motor in accordance with the phase difference between motor voltage and current waveforms, and said control signal deriving means derives said control signal from signals produced by said power factor controller.

8. A thyristor control system as claimed in claim 7 wherein said power factor controller produces first and second signals proportional the square of to the load voltage and the inverse thereof, and third and fourth signals proportional to the square of the load current and the inverse thereof, and includes summing means for selectively summing said signals to produce a first square wave having a pulse duration proportional to the phase shift for a positive half cycle of the input current and a second square wave having a pulse duration proportional to the phase shift for a negative half cycle of the input current, said control signal being derived from said square waves.

9. In a thyristor control system for an alternating current input to a load which produces a difference in phase between the load current and voltage waveforms, said system comprising means for sensing the load current and voltage and for producing a phase difference output signal proportional to the phase difference between the load current and load voltage; means for generating a preselected power factor command signal; means responsive to said phase difference output signal and said power factor command signal for producing a first control signal; ramp generator means for sensing said alternating current input and for generating a voltage ramp in timed relation to said alternating current input; means responsive to said voltage ramp and said first control signal for producing a second control signal; a thyristor for controlling the current flow through the load; and control means responsive to said second control signal for controlling switching of said thyristor, the improvement wherein a further means responsive to said phase difference output signal is provided for generating a third control signal and wherein said control means includes means responsive to said second control signal and said third control signal for generating firing pulses for firing said thyristor and for inhibiting generating of a firing pulse for firing said thyristor until a time when no current is flowing from the previous half cycle of the alternating current input.

* * * * *